(12) United States Patent
Koyama et al.

(10) Patent No.: US 11,110,885 B2
(45) Date of Patent: Sep. 7, 2021

(54) GAS GENERATOR

(71) Applicant: NIPPON KAYAKU KABUSHIKI KAISHA, Chiyoda-ku (JP)

(72) Inventors: Hiroaki Koyama, Himeji (JP); Shinya Ueda, Himeji (JP); Satoshi Ohsugi, Himeji (JP); Makoto Tsuruta, Himeji (JP); Motohiro Kanaji, Himeji (JP); Hirotaka Mukunoki, Himeji (JP)

(73) Assignee: NIPPON KAYAKU KABUSHIKI KAISHA, Chiyoda-ku (JP)

( * ) Notice: Subject to any disclaimer, the term of this patent is extended or adjusted under 35 U.S.C. 154(b) by 97 days.

(21) Appl. No.: 16/607,565

(22) PCT Filed: Mar. 13, 2018

(86) PCT No.: PCT/JP2018/009748
§ 371 (c)(1),
(2) Date: Oct. 23, 2019

(87) PCT Pub. No.: WO2018/198558
PCT Pub. Date: Nov. 1, 2018

(65) Prior Publication Data
US 2020/0139925 A1 May 7, 2020

(30) Foreign Application Priority Data

Apr. 28, 2017 (JP) .............................. JP2017-090623

(51) Int. Cl.
*B60R 21/26* (2011.01)
*B60R 21/264* (2006.01)
*B60R 21/274* (2011.01)

(52) U.S. Cl.
CPC .......... *B60R 21/264* (2013.01); *B60R 21/274* (2013.01); *B60R 2021/26011* (2013.01);
(Continued)

(58) Field of Classification Search
CPC ........ B60R 2021/26076; B60R 21/274; B60R 21/264; B60R 2021/26029; B60R 2021/26011; B01J 7/00
See application file for complete search history.

(56) References Cited

U.S. PATENT DOCUMENTS

| 2013/0276663 | A1* | 10/2013 | Ohsugi | ............... | B60R 21/2644 |
| | | | | | 102/530 |
| 2016/0016529 | A1* | 1/2016 | Bierwirth | ................. | F42B 3/04 |
| | | | | | 280/728.2 |
| 2016/0121841 | A1* | 5/2016 | Katsuta | ................. | B60R 21/264 |
| | | | | | 102/530 |

FOREIGN PATENT DOCUMENTS

| JP | 2008-183939 A | | 8/2008 |
| JP | 2008183939 A | * | 8/2008 |

(Continued)

OTHER PUBLICATIONS

Machine translation of Hasegawa et al. (JP 2008183939 A) from espacenet.com, Mar. 24 (Year: 2021).*

(Continued)

*Primary Examiner* — Paul N Dickson
*Assistant Examiner* — Maxwell L Meshaka
(74) *Attorney, Agent, or Firm* — Oblon, McClelland, Maier & Neustadt, L.L.P.

(57) ABSTRACT

A gas generator includes an igniter, a cup-shaped member, and a fixing member. The cup-shaped member accommodating an enhancer agent bursts or melts at the time of activation. The fixing member fixing a filter does not burst and melt even at the time of activation. Ra and Ha satisfy a condition of Ra/Ha 1.00 where Ra represents an inner diameter of a sidewall portion of the cup-shaped member and Ha represents a distance between a top wall portion of the cup-shaped member and the igniter. The sidewall portion includes a first region surrounded by a partition wall portion (Continued)

of the fixing member and a second region not surrounded by the partition wall portion. The partition wall portion has an end portion arranged closer to a top plate portion than the igniter. A gas generating agent is arranged to face the top wall portion, the second region, and the partition wall portion.

8 Claims, 6 Drawing Sheets

(52) U.S. Cl.
CPC ............... *B60R 2021/26029* (2013.01); *B60R 2021/26076* (2013.01)

(56) References Cited

FOREIGN PATENT DOCUMENTS

| JP | 2015-3650 | A |   | 1/2015 |           |
|----|-----------|---|---|--------|-----------|
| JP | 2015003650 | A | * | 1/2015 | ........... B60R 21/264 |
| JP | 2016-166008 | A |   | 9/2016 |           |
| JP | 2017-61185 | A |   | 3/2017 |           |
| JP | 2017061185 | A | * | 3/2017 |           |
| JP | 2018075887 | A | * | 5/2018 |           |
| JP | 2018122851 | A | * | 8/2018 |           |

OTHER PUBLICATIONS

International Search Report dated Jun. 12, 2018 in PCT/JP2018/009748 filed on Mar. 13, 2018.

* cited by examiner

GAS GENERATOR

CROSS-REFERENCE TO RELATED APPLICATIONS

This application is a United States national stage application of International Application No. PCT/JP2018/009748, filed Mar. 13, 2018, which designates the United States, and claims priority to Japanese Patent Application No. 2017-090623, filed Apr. 28, 2017, and the entire contents of each of the above applications are hereby incorporated herein by reference in entirety.

TECHNICAL FIELD

The present invention relates to a gas generator incorporated in a passenger protection apparatus which protects a driver and/or a passenger at the time of collision of a vehicle or the like, and particularly to a gas generator incorporated in an air bag apparatus equipped in a car.

BACKGROUND ART

From a point of view of protection of a driver and/or a passenger in a car, an air bag apparatus which is a passenger protection apparatus has conventionally widely been used. The air bag apparatus is equipped for the purpose of protecting a driver and/or a passenger against shock caused at the time of collision of a vehicle, and it receives a body of a driver or a passenger with an air bag serving as a cushion, as the air bag is expanded and developed instantaneously at the time of collision of the vehicle.

The gas generator is equipment which is incorporated in this air bag apparatus, an igniter therein being ignited in response to power feed through a control unit at the time of collision of a vehicle to thereby burn a gas generating agent with flame caused by the igniter and instantaneously generate a large amount of gas, and thus expands and develops an air bag.

Gas generators of various structures are available. A disc-type gas generator in a short substantially columnar shape relatively great in outer diameter is available as a gas generator particularly suitably used for an air bag apparatus on a driver's seat side or an air bag apparatus on a passenger's seat side.

A disc-type gas generator includes a short substantially cylindrical housing having opposing axial ends closed, a plurality of gas discharge openings being provided in a circumferential wall portion of the housing, the housing accommodating an enhancer agent such that the enhancer agent faces an igniter assembled to the housing, the housing being further filled with a gas generating agent to surround the enhancer agent, and a filter being accommodated in the housing to further surround the gas generating agent.

For example, Japanese Patent Laying-Open No. 2008-183939 (PTL 1) discloses a specific construction of the disc-type gas generator.

CITATION LIST

Patent Literature

PTL 1: Japanese Patent Laying-Open No. 2008-183939

SUMMARY OF INVENTION

Technical Problem

Depending on specifications of an air bag apparatus which incorporates a gas generator, there are various types of disc-type gas generators ranging from those relatively small in amount of generation of gas at the time of activation to those relatively large in that amount.

Among such disc-type gas generators, a disc-type gas generator of which amount of generation of gas at the time of activation is set to be relatively large is more disadvantageous in delay in start of discharge of gas to the outside through a gas discharge opening after a time point of activation of an igniter than a disc-type gas generator of which amount of generation of gas at the time of activation is set to be relatively small. This is exclusively due to a relatively large amount of gas generating agent and enhancer agent filled in the disc-type gas generator of which amount of generation of gas at the time of activation is set to be relatively large.

With increase in amount of gas generating agent and enhancer agent to be loaded, a housing is inevitably increased in size, and consequently a distance from the igniter to the gas discharge opening is also increased. Therefore, gas generated immediately after start of activation should pass through a longer path until it reaches the gas discharge opening, which causes the delay.

With increase in amount of gas generating agent and enhancer agent to be loaded, an amount of unburned gas generating agent and enhancer agent immediately after start of activation is also inevitably increased. This increase brings about a flow resistance against gas generated immediately after start of activation, which causes the delay.

Furthermore, with increase in amount of enhancer agent to be loaded, the enhancer agent arranged at a position distant from the igniter cannot quickly be ignited. Consequently, smooth combustion of the gas generating agent is impeded, which also causes the delay.

Such a phenomenon of delay in start of discharge of gas to the outside through a gas discharge opening after the time point of activation of the igniter leads also to delay in development of an air bag. Therefore, how to prevent the delay is an important issue.

In a disc-type gas generator disclosed in Japanese Patent Laying-Open No. 2008-183939, a cup-shaped member which accommodates an enhancer agent is formed from a weak member which bursts or melts by combustion of the enhancer agent with activation of the igniter, and a partition wall portion which does not burst or melt even by combustion of the enhancer agent with activation of the igniter is provided as surrounding the cup-shaped member to reach a position intermediate in the combustion chamber which accommodates the gas generating agent.

In the disc-type gas generator thus constructed, spread of combustion of the gas generating agent at the time of activation of the igniter is restricted by the partition wall portion. Therefore, combustion of the gas generating agent spreads to bypass the partition wall portion so that the gas generating agent can be prevented from burning out in a short period of time.

Thus, the technique disclosed in Japanese Patent Laying-Open No. 2008-183939 aims to avoid burnout of the gas generating agent in a short period of time in a disc-type gas generator of which amount of generation of gas at the time of activation is set to relatively be small, and it is not assumed to be applied to a disc-type gas generator of which amount of generation of gas at the time of activation is set to relatively be large.

The present invention was made in view of the problem described above, and one of objects thereof is to provide a gas generator set to relatively be large in amount of generation of gas at the time of activation that is capable of effectively preventing delay in start of discharge of gas to the outside through a gas discharge opening after a time point of activation of an igniter.

Solution to Problem

A gas generator based on a first aspect of the present invention includes a housing, an igniter, a cup-shaped member, a filter, and a fixing member. The housing includes a cylindrical circumferential wall portion provided with a gas discharge opening and a top plate portion and a bottom plate portion which close one and the other axial ends of the circumferential wall portion, and contains a combustion chamber which accommodates a gas generating agent. The igniter is assembled to the bottom plate portion and includes an ignition portion which accommodates an ignition agent ignited at the time of activation. The cup-shaped member contains an enhancer chamber which accommodates an enhancer agent, and is arranged to protrude toward the combustion chamber such that the enhancer chamber faces the ignition portion. A whole portion of the cup-shaped member which defines the enhancer chamber bursts or melts by combustion of the enhancer agent with activation of the igniter. The filter is located in the housing and made from a cylindrical member arranged along an inner circumferential surface of the circumferential wall portion to surround the combustion chamber. The fixing member fixes the filter to the housing, and does not burst or melt even by combustion of the enhancer agent with activation of the igniter. The cup-shaped member includes a cylindrical sidewall portion which defines the enhancer chamber and a top wall portion which defines the enhancer chamber and closes an axial end portion of the sidewall portion located on a side of the top plate portion. The fixing member includes a base portion applied to the bottom plate portion along an inner bottom surface of the bottom plate portion, an abutment portion which abuts on an inner circumferential surface of the filter close to the bottom plate portion, and a cylindrical partition wall portion erected from the base portion toward the top plate portion. Ra and Ha satisfy a condition of Ra/Ha≤1.00 where Ra represents an inner diameter of the sidewall portion and Ha represents a distance between the top wall portion and the ignition portion along an axial direction of the circumferential wall portion. The sidewall portion includes a first region located on a side of the bottom plate portion and surrounded by the partition wall portion and a second region located on a side of the top plate portion and not surrounded by the partition wall portion, by arranging the partition wall portion to reach a position in the combustion chamber intermediate along the axial direction of the circumferential wall portion. An end portion of the partition wall portion on the side of the top plate portion is arranged closer to the top plate portion than the ignition portion along the axial direction of the circumferential wall portion. The gas generating agent is arranged to face at least the top wall portion, the second region of the sidewall portion, and an outer circumferential surface of the partition wall portion.

In the gas generator based on the first aspect of the present invention, preferably, Ra and Ha further satisfy a condition of Ra/Ha≤0.80.

In the gas generator based on the first aspect of the present invention, preferably, Hb satisfies a condition of Hb≤13.5 [mm] where Hb represents a distance between the end portion of the partition wall portion on the side of the top plate portion and the ignition portion along the axial direction of the circumferential wall portion.

In the gas generator based on the first aspect of the present invention, preferably, the gas discharge opening is provided at a position closer to the top plate portion than the partition wall portion in the axial direction of the circumferential wall portion.

In the gas generator based on the first aspect of the present invention, preferably, the gas discharge opening is provided at a position opposed to the second region of the sidewall portion in a radial direction of the circumferential wall portion.

In the gas generator based on the first aspect of the present invention, the base portion may be in a shape of an annular plate, and in that case, preferably, the abutment portion is provided to extend from an outer edge of the base portion and the partition wall portion is provided to extend from an inner edge of the base portion.

In the gas generator based on the first aspect of the present invention, preferably, the gas generating agent is not arranged in a space between the first region of the sidewall portion and the partition wall portion.

In the gas generator based on the first aspect of the present invention, the partition wall portion may include a tapered portion tapered toward the top plate portion.

A gas generator based on a second aspect of the present invention includes a housing, an igniter, and a holding portion. The housing includes a cylindrical circumferential wall portion provided with a gas discharge opening and a top plate portion and a bottom plate portion which close one and the other axial ends of the circumferential wall portion, and contains a combustion chamber which accommodates a gas generating agent. The igniter serves to burn the gas generating agent. The holding portion is provided in the bottom plate portion and holds the igniter. The bottom plate portion includes a protruding cylindrical portion provided to protrude toward the top plate portion. An opening in which the igniter is inserted and arranged is provided in an axial end portion of the protruding cylindrical portion located on a side of the top plate portion. The holding portion is made of a resin molded portion at least partly secured to the bottom plate portion by being formed by attaching a fluid resin material to the bottom plate portion so as to reach a part of an outer surface of the bottom plate portion from a part of an inner surface of the bottom plate portion through the opening and solidifying the fluid resin material. The bottom plate portion in a portion except for the protruding cylindrical portion is in such an inclined shape as being inclined toward the top plate portion, in a direction toward a radially outer side of the circumferential wall portion. An inclination angle θ1 of the bottom plate portion in the portion except for the protruding cylindrical portion satisfies a condition of 0[°]<θ1≤2[°].

Advantageous Effects of Invention

According to one aspect of the present invention, in a gas generator of which amount of generation of gas at the time of activation is set to relatively be large, delay in start of discharge of gas to the outside through a gas discharge opening after a time point of activation of an igniter can effectively be prevented.

DESCRIPTION OF EMBODIMENTS

An embodiment of the present invention will be described hereinafter in detail with reference to the drawings. An embodiment shown below represents application of the present invention to a disc-type gas generator suitably incorporated in an air bag apparatus equipped in a steering wheel or the like of a car. The same or common elements in the embodiment shown below have the same reference characters allotted in the drawings and description thereof will not be repeated.

First Embodiment

Figure 1:
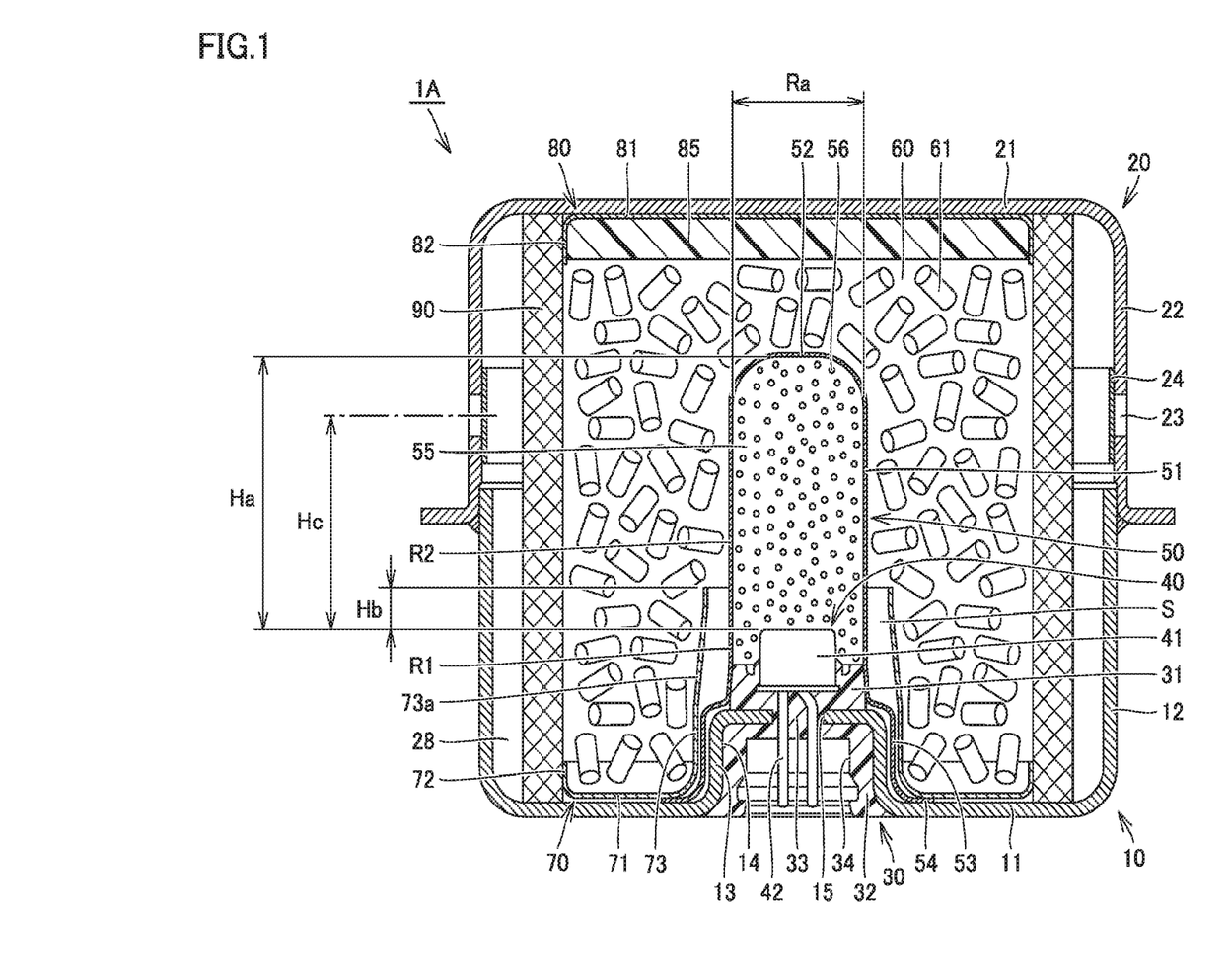
FIG. 1 is a schematic diagram of a disc-type gas generator in a first embodiment of the present invention.

FIG. 1 is a schematic diagram of a disc-type gas generator in a first embodiment of the present invention. A construction of a disc-type gas generator 1A in the present embodiment will initially be described with reference to FIG. 1. Disc-type gas generator 1A in the present embodiment is set to relatively be large in amount of generation of gas at the time of activation, and the amount of generation of gas thereof is set to approximately 3.0 [mol].

As shown in FIG. 1, disc-type gas generator 1A in the present embodiment has a short substantially cylindrical housing having axial one and the other ends closed, and is constructed to accommodate as internal construction components in an accommodation space provided in the housing, a holding portion 30, an igniter 40, a cup-shaped member 50, an enhancer agent 56, a gas generating agent 61, a lower supporting member 70 as a fixing member, an upper supporting member 80, a cushion material 85, a filter 90, and the like. In the accommodation space provided in the housing, a combustion chamber 60 mainly accommodating gas generating agent 61 among the internal construction components described above is located.

The housing includes a lower shell 10 and an upper shell 20. Each of lower shell 10 and upper shell 20 is made, for example, of a press-formed product formed by press-working a plate-shaped member made of a rolled metal. A metal plate composed, for example, of stainless steel, iron steel, an aluminum alloy, a stainless alloy, or the like is made use of as the plate-shaped member made of metal which forms lower shell 10 and upper shell 20, and what is called a high tensile steel plate which is free from such a failure as fracture even at the time of application of tensile stress not lower than 440 [MPa] and not higher than 780 [MPa] is suitably made use of.

Lower shell 10 and upper shell 20 are each formed in a substantially cylindrical shape with bottom, and the housing is constructed by combining and joining the shells such that open surfaces thereof face each other. Lower shell 10 has a bottom plate portion 11 and a cylindrical portion 12 and upper shell 20 has a top plate portion 21 and a cylindrical portion 22.

Cylindrical portion 12 of lower shell 10 has an upper end press-fitted as being inserted in a lower end of cylindrical portion 22 of upper shell 20. Cylindrical portion 12 of lower shell 10 and cylindrical portion 22 of upper shell 20 are joined at a portion of abutment therebetween or in the vicinity thereof so that lower shell 10 and upper shell 20 are fixed. Electron-beam welding, laser welding, friction welding, or the like can suitably be made use of for joining lower shell 10 and upper shell 20 to each other.

A portion of a circumferential wall portion of the housing close to bottom plate portion 11 is thus formed by cylindrical portion 12 of lower shell 10, and a portion of the circumferential wall portion of the housing close to top plate portion 21 is formed by cylindrical portion 22 of upper shell 20. One and the other axial ends of the housing are closed by bottom plate portion 11 of lower shell 10 and top plate portion 21 of upper shell 20, respectively.

A protruding cylindrical portion 13 protruding toward top plate portion 21 is provided in a central portion of bottom plate portion 11 of lower shell 10, so that a depression portion 14 is formed in the central portion of bottom plate portion 11 of lower shell 10. Protruding cylindrical portion 13 is a site to which igniter 40 is fixed with holding portion 30 being interposed, and depression portion 14 is a site serving as a space for providing a female connector portion 34 in holding portion 30.

Protruding cylindrical portion 13 is formed to be in a substantially cylindrical shape with bottom, and an opening 15 in a non-point-symmetrical shape (for example, in a D shape, a barrel shape, or an elliptical shape) when viewed two-dimensionally is provided at an axial end portion located on a side of top plate portion 21. Opening 15 is a site through which a pair of terminal pins 42 of igniter 40 passes.

Igniter 40 serves to produce flames and includes an ignition portion 41 and a pair of terminal pins 42 described above. Ignition portion 41 contains an ignition agent producing flames by being ignited to burn at the time of activation and a resistor for igniting this ignition agent. The pair of terminal pins 42 is connected to ignition portion 41 for igniting the ignition agent.

More specifically, ignition portion 41 includes a squib cup formed like a cup and a plug closing an opening end of the squib cup and holding a pair of terminal pins 42 as being inserted therein. The resistor (bridge wire) is attached to couple tip ends of the pair of terminal pins 42 inserted in the squib cup, and the ignition agent is loaded in the squib cup so as to surround the resistor or to be in proximity to the resistor.

Here, a Nichrome wire or the like is generally made use of as a resistor, and ZPP (zirconium potassium perchlorate), ZWPP (zirconium tungsten potassium perchlorate), lead tricinate, or the like is generally made use of as the ignition agent. The squib cup and the plug described above are generally made of a metal or plastic.

Upon sensing collision, a prescribed amount of current flows in a resistor through terminal pin 42. As the prescribed amount of current flows in the resistor, Joule heat is generated in the resistor and the ignition agent starts burning. Flame at a high temperature caused by being burnt bursts the squib cup accommodating the ignition agent. A time period from flow of a current in the resistor until activation of igniter 40 is generally not longer than 2 [ms] in a case that the Nichrome wire is employed as the resistor.

Igniter 40 is attached to bottom plate portion 11 in such a manner that terminal pin 42 is introduced from the inside of lower shell 10 to pass through opening 15 provided in protruding cylindrical portion 13. Specifically, holding portion 30 formed from a resin molded portion is provided around protruding cylindrical portion 13 provided in bottom plate portion 11, and igniter 40 is fixed to bottom plate portion 11 as being held by holding portion 30.

Holding portion 30 is formed through injection molding (more specifically, insert molding) with the use of a mold, and formed by attaching an insulating fluid resin material to bottom plate portion 11 so as to reach a part of an outer surface from a part of an inner surface of bottom plate portion 11 through opening 15 provided in bottom plate portion 11 of lower shell 10 and solidifying the fluid resin material.

For a source material for holding portion 30 formed by injection molding, a resin material excellent in heat resistance, durability, corrosion resistance, and the like after curing is suitably selected and made use of. In that case, without being limited to a thermosetting resin represented by an epoxy resin and the like, a thermoplastic resin represented by a polybutylene terephthalate resin, a polyethylene terephthalate resin, a polyamide resin (such as nylon 6 or nylon 66), a polypropylene sulfide resin, a polypropylene oxide resin, and the like can also be made use of. In a case where these thermoplastic resins are selected as a source material, in order to ensure mechanical strength of holding portion 30 after molding, glass fibers or the like are preferably contained as fillers in these resin materials. In a case where sufficient mechanical strength can be ensured only by a thermoplastic resin, however, a filler as described above does not have to be added.

Holding portion 30 has an inner cover portion 31 covering a part of an inner surface of bottom plate portion 11 of lower shell 10, an outer cover portion 32 covering a part of an outer surface of bottom plate portion 11 of lower shell 10, and a coupling portion 33 located within opening 15 provided in bottom plate portion 11 of lower shell 10 and continuing to each of inner cover portion 31 and outer cover portion 32.

Holding portion 30 is secured to bottom plate portion 11 at a surface on a side of bottom plate portion 11, of each of inner cover portion 31, outer cover portion 32, and coupling portion 33. Holding portion 30 is secured at each of a side surface and a lower surface of igniter 40 which is closer to a lower end of ignition portion 41, as well as a surface of a portion of igniter 40 which is closer to an upper end of terminal pin 42.

Thus, opening 15 is completely buried by terminal pin 42 and holding portion 30, so that hermeticity of the space in the housing is ensured by sealability ensured in that portion. Since opening 15 is in a non-point-symmetrical shape in a plan view as described above, opening 15 and coupling portion 33 function also as a turning prevention mechanism which prevents holding portion 30 from turning with respect to bottom plate portion 11 by burying opening 15 with coupling portion 33.

In a portion of outer cover portion 32 of holding portion 30, which faces the outside, female connector portion 34 is formed. This female connector portion 34 is a site for receiving a male connector (not shown) of a harness for connecting igniter 40 and a control unit (not shown) to each other, and it is located in depression portion 14 provided in bottom plate portion 11 of lower shell 10.

In this female connector portion 34, a portion of igniter 40 closer to the lower end of terminal pin 42 is arranged as being exposed. The male connector is inserted in female connector portion 34, so that electrical conduction between a core wire of the harness and terminal pin 42 is established.

Injection molding described above may be carried out with the use of lower shell 10 obtained by providing an adhesive layer in advance at a prescribed position on a surface of bottom plate portion 11 in a portion to be covered with holding portion 30. The adhesive layer can be formed by applying an adhesive in advance to a prescribed position of bottom plate portion 11 and curing the adhesive.

By doing so, the cured adhesive layer is located between bottom plate portion 11 and holding portion 30, so that holding portion 30 formed from a resin molded portion can more firmly be secured to bottom plate portion 11. Therefore, by providing the adhesive layer annularly along a circumferential direction so as to surround opening 15 provided in bottom plate portion 11, higher sealability can be ensured in that portion.

For the adhesive applied in advance to bottom plate portion 11, an adhesive containing as a source material, a resin material excellent in heat resistance, durability, corrosion resistance, and the like after curing is suitably made use of, and for example, an adhesive containing a cyanoacrylate-based resin or a silicone-based resin as a source material is particularly suitably made use of. An adhesive containing as a source material other than the resin materials described above, a phenol-based resin, an epoxy-based resin, a melamine-based resin, a urea-based resin, a polyester-based resin, an alkyd-based resin, a polyurethane-based resin, a polyimide-based resin, a polyethylene-based resin, a polypropylene-based resin, a polyvinyl chloride-based resin, a polystyrene-based resin, a polyvinyl acetate-based resin, a polytetrafluoroethylene-based resin, an acrylonitrile butadiene styrene-based resin, an acrylonitrile styrene-based resin, an acrylic resin, a polyamide-based resin, a polyacetal-based resin, a polycarbonate-based resin, a polyphenylene ether-based resin, a polybutylene terephthalate-based resin, a polyethylene terephthalate-based resin, a polyolefin-based resin, a polyphenylene sulfide-based resin, a polysulfone-based resin, a polyether sulfone-based resin, a polyarylate-based resin, a polyether ether ketone-based resin, a polyamide imide-based resin, a liquid crystal polymer, styrene-based rubber, olefin-based rubber, and the like can be made use of as the adhesive described above.

Though such a construction example that igniter 40 can be fixed to lower shell 10 by injection molding holding portion 30 formed from the resin molded portion is exemplified, other alternative means can also be used for fixing igniter 40 to lower shell 10.

Cup-shaped member 50 is assembled to bottom plate portion 11 so as to cover protruding cylindrical portion 13, holding portion 30, and igniter 40. Cup-shaped member 50 has a substantially cylindrical shape with bottom having an open end portion on the side of bottom plate portion 11, and contains an enhancer chamber 55 accommodating enhancer agent 56. Cup-shaped member 50 is arranged to protrude into combustion chamber 60 accommodating gas generating agent 61, such that enhancer chamber 55 provided therein faces ignition portion 41 of igniter 40.

Cup-shaped member 50 has a cylindrical sidewall portion 51 which defines enhancer chamber 55 described above, a top wall portion 52 which defines enhancer chamber 55 and closes an axial end portion of sidewall portion 51 located on the side of top plate portion 21, and an extension portion 53 provided to extend radially outward from a portion of sidewall portion 51 on a side of an open end. Extension portion 53 is formed to extend along an inner surface of bottom plate portion 11 of lower shell 10. Specifically, extension portion 53 is in a shape curved along a shape of an inner bottom surface of bottom plate portion 11 in a portion where protruding cylindrical portion 13 is provided and in the vicinity thereof and includes a tip end portion 54 extending like a flange in a radially outer portion thereof.

Tip end portion 54 in extension portion 53 is arranged between bottom plate portion 11 and lower supporting member 70 along the axial direction of the housing and sandwiched between bottom plate portion 11 and lower supporting member 70 along the axial direction of the housing. Since lower supporting member 70 is pressed toward bottom plate portion 11 by gas generating agent 61, cushion material 85, upper supporting member 80, and top plate portion 21 arranged above, cup-shaped member 50 is in such a state that tip end portion 54 of extension portion 53 is pressed toward bottom plate portion 11 by lower supporting member 70 and fixed to bottom plate portion 11. Thus, cup-shaped member 50 is prevented from falling from bottom plate portion 11 without using swaging or press-fitting for fixing cup-shaped member 50.

Cup-shaped member 50 has an opening in neither of sidewall portion 51 and top wall portion 52 and surrounds enhancer chamber 55 provided therein. This cup-shaped member 50 bursts or melts with increase in pressure in enhancer chamber 55 or conduction of heat generated therein when enhancer agent 56 is ignited as a result of activation of igniter 40, and mechanical strength thereof is relatively low.

Therefore, a member made of metal such as aluminum or an aluminum alloy or a member made of a resin such as a thermosetting resin represented by an epoxy resin and the like and a thermoplastic resin represented by a polybutylene terephthalate resin, a polyethylene terephthalate resin, a polyamide resin (such as nylon 6 or nylon 66), a polypropylene sulfide resin, a polypropylene oxide resin, and the like is suitably made use of for cup-shaped member 50.

A method of fixing cup-shaped member 50 is not limited to a fixing method using lower supporting member 70 described above, and other fixing methods may be made use of.

Enhancer agent 56 charged into enhancer chamber 55 generates thermal particles as it is ignited to burn by flames produced as a result of activation of igniter 40. Enhancer agent 56 should be able to reliably start burning gas generating agent 61, and generally, a composition composed of metal powders/oxidizing agent represented by $B/KNO_3$, $B/NaNO_3$, or $Sr(NO_3)_2$, a composition composed of titanium hydride/potassium perchlorate, or a composition composed of B/5-aminotetrazole/potassium nitrate/molybdenum trioxide is employed.

For enhancer agent 56, a powdery enhancer agent, an enhancer agent formed in a prescribed shape by a binder, or the like is made use of. A shape of enhancer agent 56 formed by a binder includes, for example, various shapes such as a granule, a column, a sheet, a sphere, a cylinder with a single hole, a cylinder with multiple holes, a tablet, and the like.

In a space surrounding a portion where cup-shaped member 50 described above is arranged in a space inside the housing, combustion chamber 60 accommodating gas generating agent 61 is located. Specifically, as described above, cup-shaped member 50 is arranged to protrude into combustion chamber 60 formed in the housing, and a space provided in a portion of this cup-shaped member 50 facing the outer surface of sidewall portion 51 and a space provided in a portion thereof facing an outer surface of top wall portion 52 are provided as combustion chamber 60.

In a space surrounding combustion chamber 60 accommodating gas generating agent 61 in a radial direction of the housing, filter 90 is arranged along an inner circumference of the housing. Filter 90 has a cylindrical shape and is arranged such that a central axis thereof substantially matches with the axial direction of the housing.

Gas generating agent 61 is an agent which is ignited by thermal particles generated as a result of activation of igniter 40 and produces gas as it burns. A non-azide-based gas generating agent is preferably employed as gas generating agent 61, and gas generating agent 61 is formed as a molding generally containing a fuel, an oxidizing agent, and an additive.

For the fuel, for example, a triazole derivative, a tetrazole derivative, a guanidine derivative, an azodicarbonamide derivative, a hydrazine derivative, or the like, or combination thereof is made use of. Specifically, for example, nitroguanidine, guanidine nitrate, cyanoguanidine, 5-aminotetrazole, and the like are suitably made use of.

As the oxidizing agent, for example, basic nitrate such as basic copper nitrate, perchlorate such as ammonium perchlorate or potassium perchlorate, nitrate containing cations selected from an alkali metal, an alkali earth metal, a transition metal, and ammonia, or the like is made use of. As the nitrate, for example, sodium nitrate, potassium nitrate, or the like is suitably made use of.

As the additive, a binder, a slag formation agent, a combustion modifier, or the like is exemplified. As the binder, for example, an organic binder such as polyvinyl alcohol, metal salt of carboxymethyl cellulose, and stearate, or an inorganic binder such as synthetic hydrotalcite and Japanese acid clay can suitably be made use of. In addition, as the binder, polysaccharide derivatives such as hydroxyethyl cellulose, hydroxypropyl methylcellulose, cellulose acetate, cellulose propionate, cellulose acetate butyrate, nitrocellulose, microcrystalline cellulose, guar gum, polyvinyl pyrrolidone, polyacrylamide, and starch and inorganic binders such as molybdenum disulfide, talc, bentonite, diatomite, kaolin, and alumina can also suitably be made use of. As the slag formation agent, silicon nitride, silica, Japanese acid clay, or the like can suitably be made use of. As the combustion modifier, a metal oxide, ferrosilicon, activated carbon, graphite, or the like can suitably be made use of.

A shape of a molding of gas generating agent 61 includes various shapes such as a particulate shape including a granule, a pellet, and a column, and a disc shape. In addition, among columnar moldings, a molding with holes having through holes in the molding (such as a cylindrical shape with a single hole or a cylindrical shape with multiple holes) is also made use of. These shapes are preferably selected as appropriate depending on specifications of an air bag apparatus in which disc-type gas generator 1A is incorporated, and for example, a shape optimal for the specifications is preferably selected by selecting a shape allowing change over time of a rate of generation of gas during burning of gas generating agent 61. Furthermore, in addition to a shape of gas generating agent 61, a size of a molding or an amount thereof for filling is preferably selected as appropriate, in consideration of a linear burning velocity, a pressure exponent, or the like of gas generating agent 61.

For example, a filter obtained by winding and sintering a metal wire rod of stainless steel or iron steel, a filter formed by press-working a mesh material into which metal wire rods are knitted to thereby pack the same, or the like can be made use of as filter 90. As the mesh material, specifically, a wire gauze of stocking stitch, a plain-woven wire gauze, an aggregate of crimped metal wire rods, or the like can be made use of.

In addition, a filter obtained by winding a perforated metal plate can also be made use of as filter 90. In this case, as the perforated metal plate, for example, expanded metal obtained by making staggered cuts in a metal plate and providing holes by widening the cuts to thereby work the metal plate in a mesh, hook metal obtained by perforating a metal plate and collapsing burrs caused around a periphery of the hole for flattening, or the like is made use of. In this case, a size or a shape of a hole to be provided can be changed as appropriate as required, and holes different in size or shape may be included in the same metal plate. It is noted that, for example, a steel plate (mild steel) or a stainless steel plate can suitably be made use of as a metal plate, and a nonferrous metal plate of aluminum, copper, titanium, nickel, or an alloy thereof, or the like can also be made use of.

Filter 90 functions as cooling means for cooling gas by removing heat at a high temperature of the gas when the gas produced in combustion chamber 60 passes through this filter 90 and also functions as removal means for removing residues (slug) or the like contained in the gas. Therefore, in order to sufficiently cool the gas and to prevent emission of residues to the outside, the gas generated in combustion chamber 60 should reliably pass through filter 90. Filter 90 is arranged to be distant from cylindrical portions 12 and 22 so as to provide a gap 28 of a prescribed size between cylindrical portion 12 of lower shell 10 and cylindrical portion 22 of upper shell 20 which form the circumferential wall portion of the housing.

A plurality of gas discharge openings 23 are provided in cylindrical portion 22 of upper shell 20 in a portion facing filter 90. The plurality of gas discharge openings 23 serve for guiding gas which has passed through filter 90 to the outside of the housing.

To an inner circumferential surface of cylindrical portion 22 of upper shell 20, a sealing tape 24 made of a metal as a sealing member is attached to close the plurality of gas discharge openings 23. An aluminum foil or the like having a tacky member applied to its one surface is suitably made use of as this sealing tape 24 and hermeticity of combustion chamber 60 is ensured by sealing tape 24.

In the vicinity of the end portion of combustion chamber 60 located on the side of bottom plate portion 11, lower supporting member 70 is arranged. Lower supporting member 70 has an annular shape and is arranged as substantially being applied to filter 90 and bottom plate portion 11 so as to cover a boundary portion between filter 90 and bottom plate portion 11. Thus, lower supporting member 70 is located between bottom plate portion 11 and gas generating agent 61 in the vicinity of the end portion of combustion chamber 60.

Lower supporting member 70 includes a base portion 71 in a shape of an annular plate applied to bottom plate portion 11 along the inner bottom surface of bottom plate portion 11, an abutment portion 72 which abuts on an inner circumferential surface of filter 90 close to bottom plate portion 11, and a cylindrical partition wall portion 73 erected from base portion 71 toward top plate portion 21. Abutment portion 72 is provided to extend from an outer edge of base portion 71 and partition wall portion 73 is provided to extend from an inner edge of base portion 71.

Lower supporting member 70 serves as a member for fixing filter 90 to the housing and also functions as flow-out prevention means for preventing gas generated in combustion chamber 60 at the time of activation from flowing out through a gap between the lower end of filter 90 and bottom plate portion 11 without passing through filter 90. Partition wall portion 73 of lower supporting member 70 functions also as means for preventing, at the time of activation of disc-type gas generator 1A, delay in start of discharge of gas to the outside through gas discharge opening 23 after a time point of activation of igniter 40, which will be described later.

Lower supporting member 70 is made from a member which does not burst or melt even by combustion of enhancer agent 56 with activation of igniter 40. Lower supporting member 70 is formed, for example, by press-working a plate-shaped member made of metal, and suitably made of a member formed from a steel plate of common steel, special steel, or the like (such as a cold rolled steel plate or a stainless steel plate).

Tip end portion 54 of extension portion 53 of cup-shaped member 50 described above is arranged between bottom plate portion 11 and base portion 71 of lower supporting member 70 along the axial direction of the housing. Thus, tip end portion 54 is held as being sandwiched between bottom plate portion 11 and base portion 71 along the axial direction of the housing. According to the construction as such, cup-shaped member 50 is in such a state that tip end portion 54 of extension portion 53 is pressed toward bottom plate portion 11 by base portion 71 of lower supporting member 70 and fixed to bottom plate portion 11.

Upper supporting member 80 is arranged at the end portion of combustion chamber 60 located on the side of top plate portion 21. Upper supporting member 80 is substantially in a shape of a disc and is arranged as being applied to filter 90 and top plate portion 21 so as to cover the boundary portion between filter 90 and top plate portion 21. Thus, upper supporting member 80 is located between top plate portion 21 and gas generating agent 61 in the vicinity of the end portion of combustion chamber 60.

Upper supporting member 80 has a base portion 81 abutting on top plate portion 21 and an abutment portion 82 erected from a peripheral edge of base portion 81. Abutment portion 82 abuts on the inner circumferential surface of an axial end portion of filter 90 located on the side of top plate portion 21.

Upper supporting member 80 serves as a member for fixing filter 90 to the housing and also functions as flow-out prevention means for preventing gas generated in combustion chamber 60 at the time of activation from flowing out through a gap between the upper end of filter 90 and top plate portion 21 without passing through filter 90.

Upper supporting member 80 is made from a member which does not burst or melt even by combustion of enhancer agent 56 with activation of igniter 40. Similarly to lower supporting member 70, upper supporting member 80 is formed, for example, by press-working a plate-shaped member made of metal, and suitably made of a member formed from a steel plate of common steel, special steel, or the like (such as a cold rolled steel plate or a stainless steel plate).

In this upper supporting member 80, annular cushion material 85 is arranged to be in contact with gas generating agent 61 accommodated in combustion chamber 60. Cushion material 85 is thus located between top plate portion 21 and gas generating agent 61 in a portion of combustion chamber 60 on the side of top plate portion 21 and presses gas generating agent 61 toward bottom plate portion 11.

Cushion material 85 is provided for the purpose of preventing gas generating agent 61 made of a molding from being crushed by vibration or the like, and made of a member suitably formed of a molding of ceramic fibers, rock wool, or a foamed resin (such as foamed silicone, foamed polypropylene, or foamed polyethylene), or rubber represented by chloroprene and EPDM.

An operation of disc-type gas generator 1A in the present embodiment described above will now be described with reference to FIG. 1.

When a vehicle on which disc-type gas generator 1A in the present embodiment is mounted collides, collision sensing means separately provided in the vehicle senses collision, and based thereon, igniter 40 is activated in response to power feed through a control unit separately provided in the vehicle. Enhancer agent 56 accommodated in enhancer chamber 55 is ignited to burn by flames produced as a result of activation of igniter 40, to thereby generate a large amount of thermal particles. Burning of this enhancer agent 56 bursts or melts cup-shaped member 50 and the thermal particles described above flow into combustion chamber 60.

The thermal particles which have flowed in ignite and burn gas generating agent 61 accommodated in combustion chamber 60 and a large amount of gas is produced. The gas produced in combustion chamber 60 passes through filter 90. At that time, heat is removed from the gas through filter 90 and the gas is cooled, slug contained in the gas is removed by filter 90, and the gas flows into gap 28.

As a pressure in the space in the housing increases, sealing tape 24 which has closed gas discharge opening 23 provided in upper shell 20 is cleaved and the gas is discharged to the outside of the housing through gas discharge opening 23. The discharged gas is introduced in the air bag provided adjacent to disc-type gas generator 1A and it expands and develops the air bag.

As described above, disc-type gas generator 1A in the present embodiment is set to relatively be large in amount of generation of gas at the time of activation. Accordingly, the housing is made larger mainly along the axial direction to be larger in inner volume than a common housing. Thus, combustion chamber 60 constructed to be larger is filled with gas generating agent 61 in an amount larger than in a common gas generator.

With a relatively larger amount of gas generating agent 61 that is loaded, disc-type gas generator 1A is also constructed to relatively be larger in amount of enhancer agent 56 that is loaded. Specifically, cup-shaped member 50 is constructed to be larger in inner volume of enhancer chamber 55 by being constructed to relatively be longer in the axial direction of the circumferential wall portion of the housing, and enhancer chamber 55 constructed to be larger is filled with enhancer agent 56 in an amount larger than in a common gas generator.

Enhancer chamber 55 constructed to be larger is quantitatively defined by Ra and Ha satisfying a condition of Ra/Ha≤1.00 where Ra represents an inner diameter of sidewall portion 51 of cup-shaped member 50 and Ha represents a distance between top wall portion 52 of cup-shaped member 50 and ignition portion 41 of igniter 40 along the axial direction of the circumferential wall portion of the housing with reference to FIG. 1. In disc-type gas generator 1A in the present embodiment, Ra is set to approximately 14.0 [mm] and Ha is set to approximately 27.0 [mm]. A value of Ra/Ha is approximately 0.52. A disc-type gas generator set to relatively be small in amount of generation of gas at the time of activation generally satisfies a condition of Ra/Ha>1.00.

The disc-type gas generator thus constructed to satisfy the condition of Ra/Ha≤1.00 suffers from the problem of delay in start of discharge of gas to the outside through the gas discharge opening after the time point of activation of the igniter. In this regard, disc-type gas generator 1A in the present embodiment solves this problem by providing partition wall portion 73 to surround a part of sidewall portion 51 of cup-shaped member 50.

Figure 2:
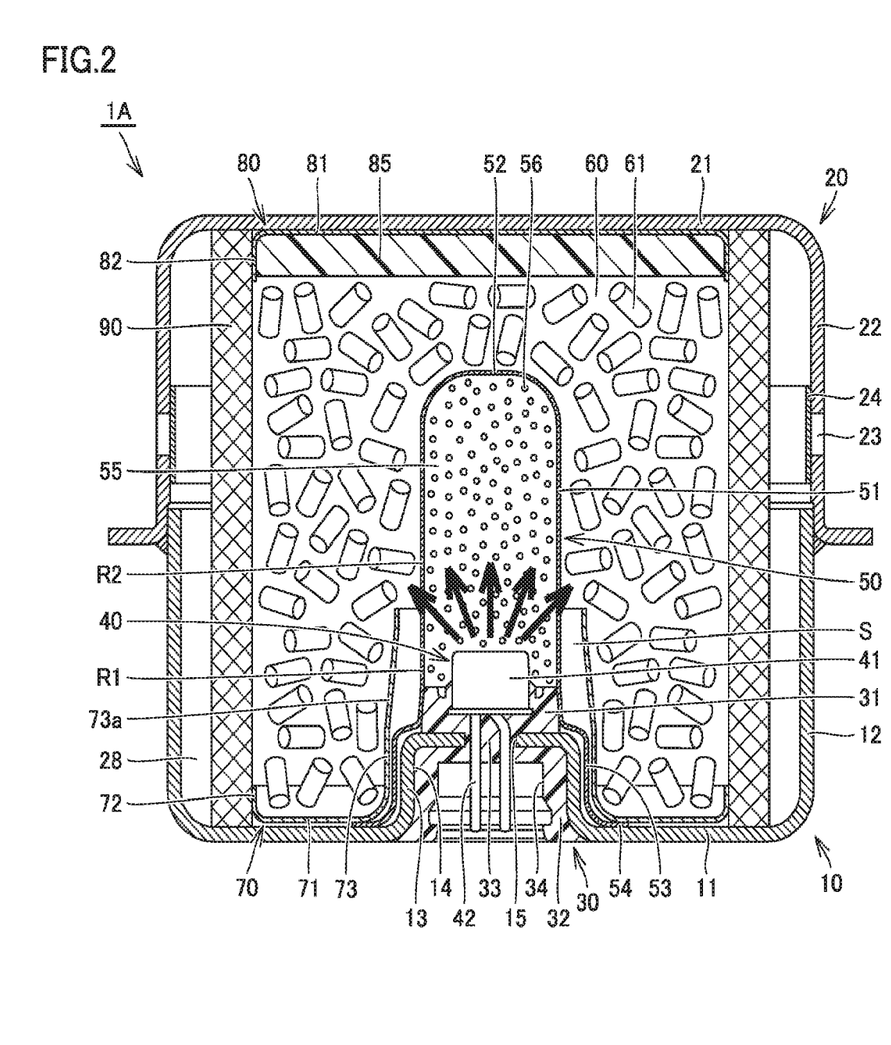
FIG. 2 is a diagram schematically showing directivity of combustion of an enhancer agent immediately after start of activation of the disc-type gas generator shown in FIG. 1.

FIG. 2 is a diagram schematically showing directivity of combustion of the enhancer agent immediately after start of activation of the disc-type gas generator shown in FIG. 1. A reason why there is no delay in start of discharge of gas to the outside through gas discharge opening 23 after the time point of activation of igniter 40 in disc-type gas generator 1A in the present embodiment will now be described with reference to FIG. 2 and FIG. 1 described previously.

As shown in FIG. 1, cylindrical partition wall portion 73 erected from the inner edge of base portion 71 of lower supporting member 70 is arranged to reach a position in combustion chamber 60 intermediate along the axial direction of the circumferential wall portion of the housing so that sidewall portion 51 of cup-shaped member 50 includes a first region R1 located on the side of bottom plate portion 11 and surrounded by partition wall portion 73 and a second region R2 located on the side of top plate portion 21 and not surrounded by partition wall portion 73.

First region R1 and second region R2 of sidewall portion 51 both correspond to a portion which defines enhancer chamber 55 of cup-shaped member 50 and they are portions which burst or melt by combustion of enhancer agent 56 with activation of igniter 40.

An end portion of partition wall portion 73 on the side of top plate portion 21 is arranged closer to top plate portion 21 than an upper surface of ignition portion 41 of igniter 40 along the axial direction of the circumferential wall portion of the housing. Ignition portion 41 of igniter 40 is thus surrounded by partition wall portion 73 in the radial direction of the circumferential wall portion of the housing.

A space S of a prescribed size is provided between partition wall portion 73 and first region R1 of sidewall portion 51, and space S is not filled with gas generating agent 61. Gas generating agent 61 is thus arranged to face top wall portion 52 of cup-shaped member 50, second region R2 of sidewall portion 51 of cup-shaped member 50, and an outer circumferential surface of partition wall portion 73 of lower supporting member 70.

According to such a construction, as shown in FIG. 2, at the time of activation of disc-type gas generator 1A, prescribed directivity can be given to a direction of scattering of thermal particles generated by combustion of some enhancer agent 56 arranged adjacently to igniter 40 (FIG. 2 schematically showing directivity with an arrow).

In general, combustion of an enhancer agent ignited by an igniter basically radially spreads, and accordingly thermal particles generated by combustion of the enhancer agent are also radially scattered and do not have directivity as described above.

In disc-type gas generator 1A in the present embodiment, however, partition wall portion 73 relatively high in mechanical strength is provided to surround ignition portion 41 of igniter 40 and a space thereabove in the radial direction of the circumferential wall portion of the housing. Accordingly, a direction of travel of thermal particles scattered toward partition wall portion 73 is changed by partition wall portion 73 to scatter toward top plate portion 21 (in other words, the direction of travel is narrowed). Therefore, combustion of enhancer agent 56 efficiently spreads toward top plate portion 21.

Thus, not only enhancer agent 56 arranged at a position close to igniter 40 but also enhancer agent 56 arranged at a position distant from igniter 40 can be ignited without delay after the time point of start of activation of igniter 40, and consequently gas generating agent 61 can smoothly burn. Therefore, gas generating agent 61 also quickly starts to burn, and delay in start of discharge of gas to the outside through gas discharge opening 23 after the time point of activation of igniter 40 can be prevented.

Therefore, with disc-type gas generator 1A as in the present embodiment described above, even though an amount of generation of gas at the time of activation is set to relatively be large, delay in start of discharge of gas to the outside through gas discharge opening 23 after the time point of activation of igniter 40 can effectively be prevented and a disc-type gas generator high in performance such as being free from delay in development of an air bag can be obtained.

Referring to FIG. 1, disc-type gas generator 1A in the present embodiment is constructed such that Hb satisfies a condition of Hb≤13.5 [mm] where Hb represents a distance between the end portion of partition wall portion 73 on the side of top plate portion 21 and ignition portion 41 of igniter 40 along the axial direction of the circumferential wall portion of the housing. In disc-type gas generator 1A in the present embodiment, Hb is set to approximately 4.0 [mm] and a ratio of Hb to Ha described above is approximately 0.15. Thus, distance Hb does not necessarily have to be set to be large, and a considerable effect can be obtained by satisfying at least a condition of Hb≤0 [mm].

This is because setting of extremely large Hb results in interference by partition wall portion 73 of combustion of gas generating agent 61 and even in failure in obtaining sufficient gas output (an amount of discharge of gas per unit time) in a stage of activation of the disc-type gas generator. Therefore, from a point of view of prevention of delay in discharge of gas and obtaining sufficiently large gas output without delay, the disc-type gas generator is preferably constructed to satisfy the condition of Hb≤13.5 [mm] as described above.

Referring to FIGS. 1 and 2, in disc-type gas generator 1A in the present embodiment, a plurality of gas discharge openings 23 provided in the circumferential wall portion of the housing are all provided at a position closer to top plate portion 21 than partition wall portion 73 in the axial direction of the circumferential wall portion of the housing.

According to such a construction, a distance from gas generating agent 61 ignited by combustion of some enhancer agent 56 immediately after start of activation of igniter 40 to gas discharge opening 23 is substantially shortest. Therefore, delay in start of discharge of gas to the outside through gas discharge opening 23 after the time point of activation of igniter 40 can further effectively be prevented.

According to such a construction, an amount of unburned gas generating agent 61 and enhancer agent 56 immediately after start of activation which are located between burned gas generating agent 61 ignited by combustion of enhancer agent 56 immediately after start of activation of igniter 40 and gas discharge opening 23 can be minimized. In this regard as well, delay in start of discharge of gas to the outside through gas discharge opening 23 after the time point of activation of igniter 40 can further effectively be prevented.

In order to reliably achieve these effects, as in disc-type gas generator 1A in the present embodiment, a plurality of gas discharge openings 23 are further preferably provided at a position opposed to second region R2 of sidewall portion 51 of cup-shaped member 50 in the radial direction of the circumferential wall portion of the housing. Specifically, disc-type gas generator 1A in the present embodiment is constructed such that a distance Hc along the axial direction of the circumferential wall portion of the housing between a position where the plurality of gas discharge openings 23 are provided and ignition portion 41 of igniter 40 is set to approximately 21.0 [mm], so that the plurality of gas discharge openings 23 are provided at a position opposed to second region R2 of sidewall portion 51 of cup-shaped member 50 in the radial direction of the circumferential wall portion of the housing.

Referring further to FIGS. 1 and 2, in disc-type gas generator 1A in the present embodiment, partition wall portion 73 of lower supporting member 70 includes a tapered portion 73a tapered toward top plate portion 21. By thus providing tapered portion 73a in a tapered shape in partition wall portion 73, stronger directivity can be provided to a direction of scattering of thermal particles generated by combustion of some enhancer agent 56 arranged adjacently to igniter 40. Therefore, enhancer agent 56 arranged at a position distant from igniter 40 can be ignited earlier after the time point of start of activation of igniter 40, and delay in start of discharge of gas to the outside through gas discharge opening 23 after the time point of activation of igniter 40 can further effectively be prevented.

The effect described above is achieved by applying the present invention to the disc-type gas generator constructed to satisfy the condition of Ra/Ha≤1.00 as described previously. The present invention achieves a noticeable effect by being applied to a disc-type gas generator constructed to satisfy in particular a condition of Ra/Ha≤0.80, and furthermore achieves a particularly noticeable effect by being applied to a disc-type gas generator constructed to satisfy a condition of Ra/Ha≤0.60.

Figure 3:
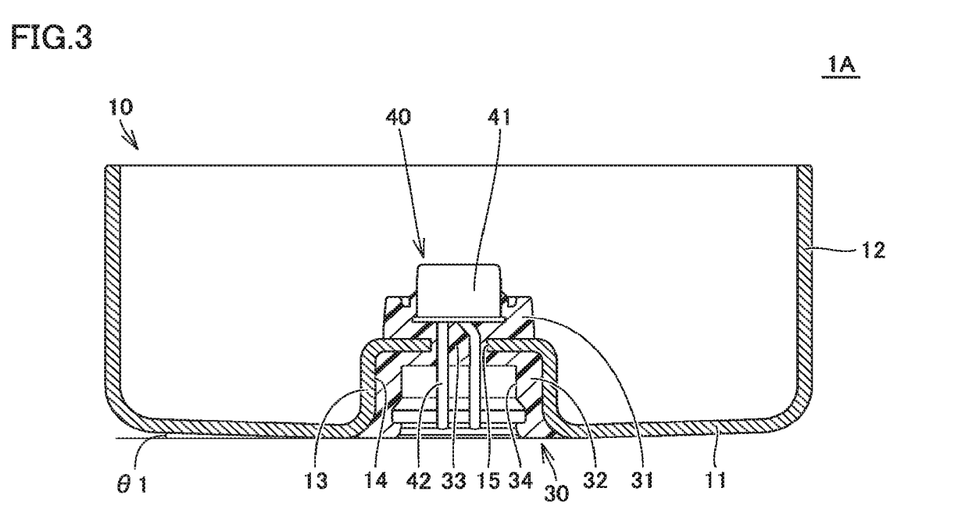
FIG. 3 is a schematic cross-sectional view of a sub assembly including a lower shell, an igniter, and a holding portion of the disc-type gas generator shown in FIG. 1.
Figure 4:
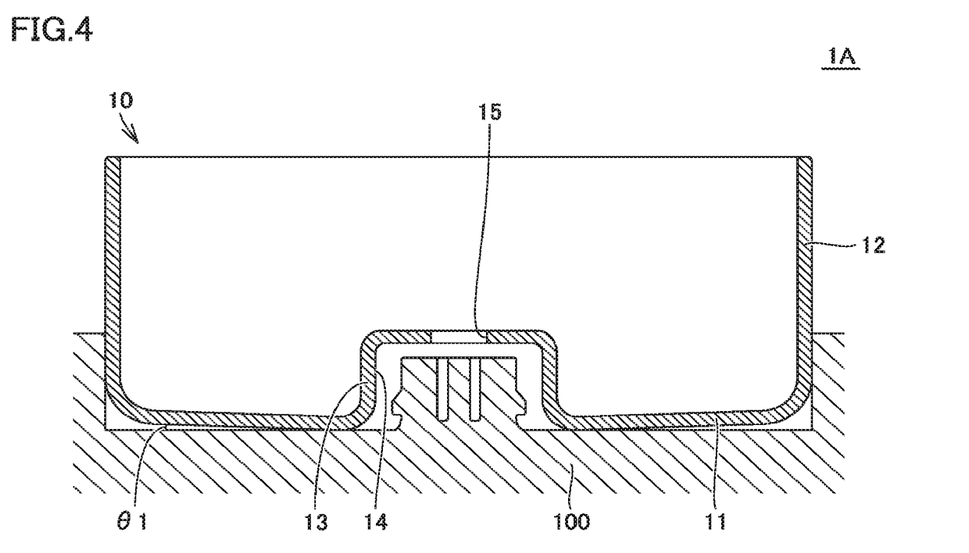
FIG. 4 is a schematic cross-sectional view showing a state that the lower shell is placed in a lower mold in a process of manufacturing the disc-type gas generator shown in FIG. 1.
Figure 5:
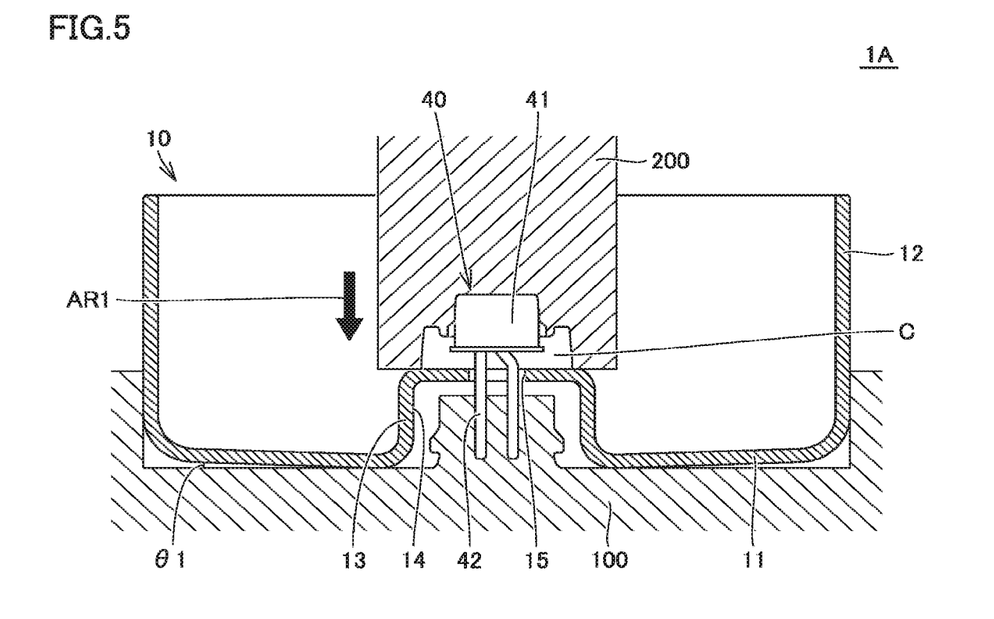
FIG. 5 is a schematic cross-sectional view showing a state in a stage before forming a holding portion by injection molding in the process of manufacturing the disc-type gas generator shown in FIG. 1.

FIG. 3 is a schematic cross-sectional view of a sub assembly including the lower shell, the igniter, and the holding portion of the disc-type gas generator shown in FIG. 1. FIG. 4 is a schematic cross-sectional view showing a state that the lower shell is placed in a lower mold in a process of manufacturing the disc-type gas generator shown in FIG. 1 and FIG. 5 is a schematic cross-sectional view showing a state in a stage before forming the holding portion by injection molding. Other characteristic features of disc-type gas generator 1A in the present embodiment and a method of manufacturing the same (in particular, a method of forming holding portion 30 by injection molding) will be described below with reference to FIGS. 3 to 5.

As shown in FIG. 3, disc-type gas generator 1A in the present embodiment is constructed such that bottom plate portion 11 in a portion except for protruding cylindrical portion 13 of lower shell 10 is in such an inclined shape as being inclined inward (that is, toward top plate portion 21), in a direction toward a radially outer side of the circumferential wall portion of the housing. An inclination angle θ1 of bottom plate portion 11 in the portion except for protruding cylindrical portion 13 preferably satisfies a condition of 0[°]<θ1≤2[°].

This is a feature for preventing spring-back of lower shell 10, which may occur in setting lower shell 10 into a mold in injection molding of holding portion 30. Spring-back will be described later in detail with reference to a disc-type gas generator 1X according to a comparative example which will be described later.

As shown in FIG. 4, in manufacturing disc-type gas generator 1A in the present embodiment, lower shell 10 is placed on a lower mold 100 in a prescribed shape and thereafter an upper mold 200 is lowered in a direction shown with an arrow AR1 in the figure so as to sandwich lower shell 10 between upper mold 200 and lower mold 100 as shown in FIG. 5. A cavity C for forming holding portion 30 by injection molding is provided between lower mold 100 and upper mold 200 around protruding cylindrical portion 13 of lower shell 10. Upper mold 200 abuts on an outer circumferential portion of an axial end portion of protruding cylindrical portion 13 of lower shell 10 located on the side of top plate portion 21 such that cavity C is provided as a closed space.

As described above, in disc-type gas generator 1A in the present embodiment, bottom plate portion 11 in the portion except for protruding cylindrical portion 13 of lower shell 10 is in such an inclined shape as being inclined inward, in the direction toward the radially outer side of the circumferential wall portion of the housing. Therefore, lower shell 10 abuts on lower mold 100 only in an inner circumferential portion of bottom plate portion 11 in the portion except for protruding cylindrical portion 13 while it is placed on lower mold 100 as shown in FIG. 4, and abuts on lower mold 100 only in the inner circumferential portion of bottom plate portion 11 in the portion except for protruding cylindrical portion 13 also in a state after the lower shell is sandwiched between lower mold 100 and upper mold 200 as shown in FIG. 5.

In the portion of bottom plate portion 11 of lower shell 10 except for the inner circumferential portion described above, lower shell 10 does not abut on lower mold 100, and the inclined shape of bottom plate portion 11 in the portion except for protruding cylindrical portion 13 of lower shell 10 is maintained also while the lower shell is sandwiched between lower mold 100 and upper mold 200.

Figure 6:
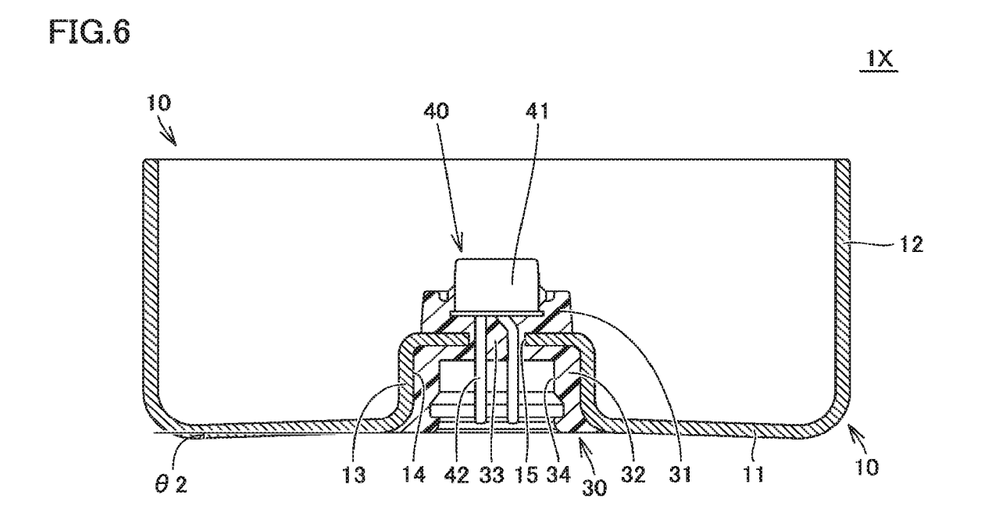
FIG. 6 is a schematic cross-sectional view of a sub assembly including a lower shell, an igniter, and a holding portion of a disc-type gas generator according to a comparative example.
Figure 7:
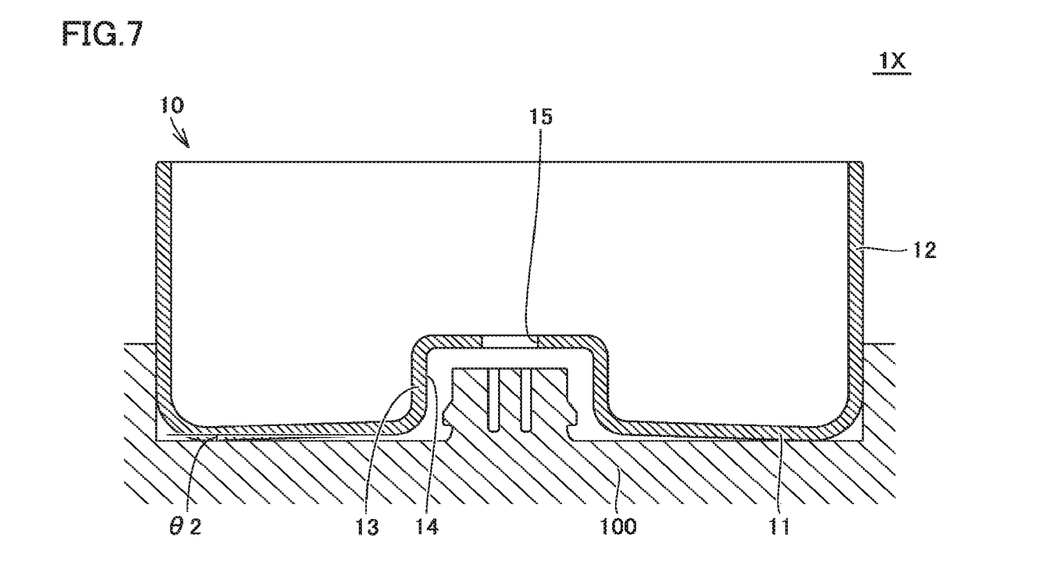
FIG. 7 is a schematic cross-sectional view showing a state that the lower shell is placed in a lower mold in a process of manufacturing the disc-type gas generator shown in FIG. 6.
Figure 8:
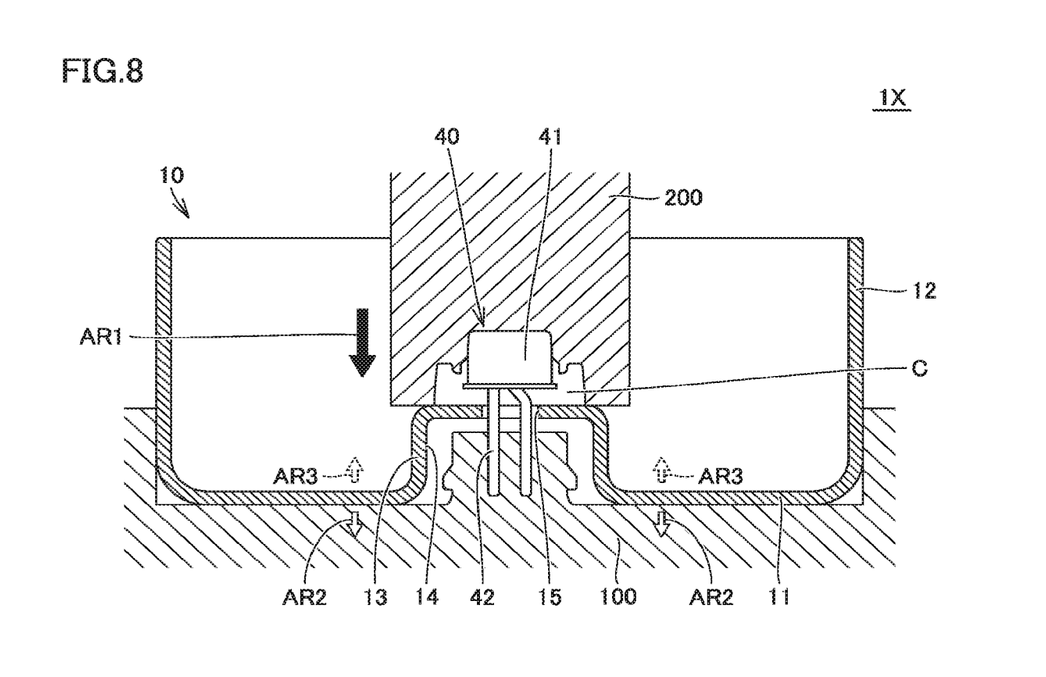
FIG. 8 is a schematic cross-sectional view showing a state in a stage before forming a holding portion by injection molding in the process of manufacturing the disc-type gas generator shown in FIG. 6.

FIG. 6 is a schematic cross-sectional view of a sub assembly including a lower shell, an igniter, and a holding portion of a disc-type gas generator according to a comparative example. FIG. 7 is a schematic cross-sectional view showing a state that the lower shell is placed in a lower mold in a process of manufacturing the disc-type gas generator shown in FIG. 6 and FIG. 8 is a schematic cross-sectional view showing a state in a stage before forming the holding portion by injection molding. A construction of disc-type gas generator 1X according to the comparative example and a method of manufacturing the same (in particular, a method of forming holding portion 30 by injection molding) will be described below with reference to FIGS. 6 to 8.

As shown in FIG. 6, disc-type gas generator 1X according to the comparative example is constructed such that bottom plate portion 11 in the portion except for protruding cylindrical portion 13 of lower shell 10 is at a prescribed inclination angle θ2 so as to be in such an inclined shape as being inclined outward (that is, toward the outside), in a direction toward the radially outer side of the circumferential wall portion of the housing.

As shown in FIG. 7, in manufacturing disc-type gas generator 1X according to the comparative example, similarly to disc-type gas generator 1A in the present embodiment described above, lower shell 10 is placed on lower mold 100 in a prescribed shape and thereafter upper mold 200 is lowered in the direction shown with arrow AR1 in the figure so as to sandwich lower shell 10 between upper mold 200 and lower mold 100 as shown in FIG. 8. Cavity C for forming holding portion 30 by injection molding is provided between lower mold 100 and upper mold 200 around protruding cylindrical portion 13 of lower shell 10. Upper mold 200 abuts on the outer circumferential portion of the axial end portion of protruding cylindrical portion 13 of lower shell 10 located on the side of top plate portion 21 such that cavity C is provided as a closed space.

As described above, in disc-type gas generator 1X according to the comparative example, bottom plate portion 11 in the portion except for protruding cylindrical portion 13 of lower shell 10 is in such an inclined shape as being inclined outward, in the direction toward the radially outer side of the circumferential wall portion of the housing. Therefore, lower shell 10 abuts on lower mold 100 only in the outer circumferential portion of bottom plate portion 11 in the portion except for protruding cylindrical portion 13 while it is placed on lower mold 100 as shown in FIG. 7, and in a state after the lower shell is sandwiched between lower mold 100 and upper mold 200 as shown in FIG. 8, the entire bottom plate portion 11 in the portion except for protruding cylindrical portion 13 abuts on lower mold 100.

While lower shell 10 is placed on lower mold 100, the inclined shape of bottom plate portion 11 in the portion except for protruding cylindrical portion 13 of lower shell 10 is maintained. As lower shell 10 is sandwiched between lower mold 100 and upper mold 200, however, the portion of lower shell 10 except for the outer circumferential portion of bottom plate portion 11 described above is displaced by being pressed in a direction shown with an arrow AR2 in the figure, and consequently lower shell 10 is elastically deformed. Bottom plate portion 11 in the portion except for protruding cylindrical portion 13 of lower shell 10 thus comes in intimate contact with lower mold 100.

When disc-type gas generator 1A in the present embodiment described above is compared with disc-type gas generator 1X according to the comparative example, a difference below is produced in forming holding portion 30.

As shown in FIG. 5, in disc-type gas generator 1A in the present embodiment, the inclined shape of bottom plate portion 11 in the portion except for protruding cylindrical portion 13 of lower shell 10 is maintained also while lower shell 10 is sandwiched between lower mold 100 and upper mold 200. Therefore, even though an insulating fluid resin material is injected into cavity C and solidified therein, the inclined shape of bottom plate portion 11 is maintained. When pressing of lower shell 10 by upper mold 200 is thereafter canceled, the inclined shape of bottom plate portion 11 is maintained. In mold release, no significant change in shape of lower shell 10 is caused.

Therefore, in mold release performed after formation of holding portion 30 as well, application of stress to holding portion 30 by mold release can be prevented, and disc-type gas generator 1A can be manufactured at a high yield without impairing intimate contact between lower shell 10 and holding portion 30.

On the other hand, in disc-type gas generator 1X according to the comparative example as shown in FIG. 8, while lower shell 10 is sandwiched between lower mold 100 and upper mold 200, lower shell 10 is elastically deformed.

Therefore, when pressing of lower shell 10 by upper mold 200 is canceled while an insulating fluid resin material is injected into cavity C and solidified therein, bottom plate portion 11 tends to return to the original shape based on elastic force and the portion of bottom plate portion 11 described above of lower shell 10 except for the outer circumferential portion is displaced in a direction shown with an arrow AR3 in the figure. This phenomenon is what is called spring-back, which apples large stress to holding portion 30 formed by injection molding.

Generation of this stress leads to the possibility of separation between lower shell 10 and holding portion 30. When such separation occurs, intimate contact between lower shell 10 and holding portion 30 is consequently impaired. Therefore, disc-type gas generator 1X according to the comparative example may not be able to maintain hermeticity in that portion, and consequently it becomes difficult to manufacture disc-type gas generator 1X at a high yield.

Lower shell 10 is made, for example, of a press-formed product formed by press-working a plate-shaped member made of a rolled metal as described above. Therefore, a shape of the shell suffers from prescribed variation during press-working. Therefore, even though press-working is performed with such an aim that bottom plate portion 11 in the portion except for protruding cylindrical portion 13 of lower shell 10 is not in the inclined shape (that is, flat), the shape is naturally varied. Consequently, press-worked workpieces include a workpiece of which bottom plate portion 11 in the portion except for protruding cylindrical portion 13 of lower shell 10 is flat, a workpiece of which bottom plate portion 11 in the above-described portion of lower shell 10 is inclined inward in the direction toward the radially outer side of the circumferential wall portion of the housing, and a workpiece of which bottom plate portion 11 in the above-described portion of lower shell 10 is inclined outward in the direction toward the radially outer side of the circumferential wall portion of the housing.

Therefore, by performing press-working in advance with such an aim that bottom plate portion 11 in the portion except for protruding cylindrical portion 13 of lower shell 10 is inclined inward in the direction toward the radially outer side of the circumferential wall portion of the housing in consideration of occurrence of variation, press-worked workpieces do not include a workpiece of which bottom plate portion 11 in the above-described portion of lower shell 10 is inclined outward in the direction toward the radially outer side of the circumferential wall portion of the housing, and occurrence of a defect due to spring-back described above can be prevented.

When inclination angle $\theta1$ described above is larger than necessary, stability in placement of lower shell 10 with respect to lower mold 100 is impaired or a volume of combustion chamber 60 where gas generating agent 61 is accommodated is decreased. Therefore, inclination angle $\theta1$ preferably satisfies a condition of $0[°]<\theta1\leq2[°]$.

Other characteristic features of disc-type gas generator 1A in the present embodiment described above are summarized as below.

A disc-type gas generator in the present embodiment includes a housing, an igniter, and a holding portion. The housing includes a cylindrical circumferential wall portion provided with a gas discharge opening and a top plate portion and a bottom plate portion which close one and the other axial ends of the circumferential wall portion, and contains a combustion chamber which accommodates a gas generating agent. The igniter serves to burn the gas generating agent. The holding portion is provided in the bottom plate portion and holds the igniter. The bottom plate portion includes a protruding cylindrical portion provided to protrude toward the top plate portion. An opening in which the igniter is inserted and arranged is provided in an axial end portion of the protruding cylindrical portion located on a side of the top plate portion. The holding portion is made of a resin molded portion at least partly secured to the bottom plate portion by being formed by attaching a fluid resin material to the bottom plate portion so as to reach a part of an outer surface of the bottom plate portion from a part of an inner surface of the bottom plate portion through the opening and solidifying the fluid resin material. The bottom plate portion in a portion except for the protruding cylindrical portion is in such an inclined shape as being inclined toward the top plate portion, in a direction toward a radially outer side of the circumferential wall portion. An inclination angle $\theta1$ of the bottom plate portion in the portion except for the protruding cylindrical portion satisfies a condition of $0[°]<\theta1\leq2[°]$.

The method of manufacturing disc-type gas generator 1A in the present embodiment described above is summarized as below.

The method of manufacturing a disc-type gas generator in the present embodiment is a method of manufacturing the disc-type gas generator in the present embodiment described above, and it includes placing a lower shell including the bottom plate portion provided with the protruding cylindrical portion on a lower mold, setting the igniter into the lower mold as being inserted in the opening, sandwiching the lower shell between the upper mold and the lower mold by lowering the upper mold toward the lower mold, forming the holding portion by injecting the fluid resin material into a cavity defined by the lower mold, the upper mold, the lower shell, and the igniter and solidifying the fluid resin material, and releasing the upper mold and the lower mold from the lower shell in which the holding portion is formed. In the sandwiching the lower shell between the upper mold and the lower mold, the upper mold is lowered to abut on the outer circumferential portion of the protruding cylindrical portion.

Second Embodiment

Figure 9:
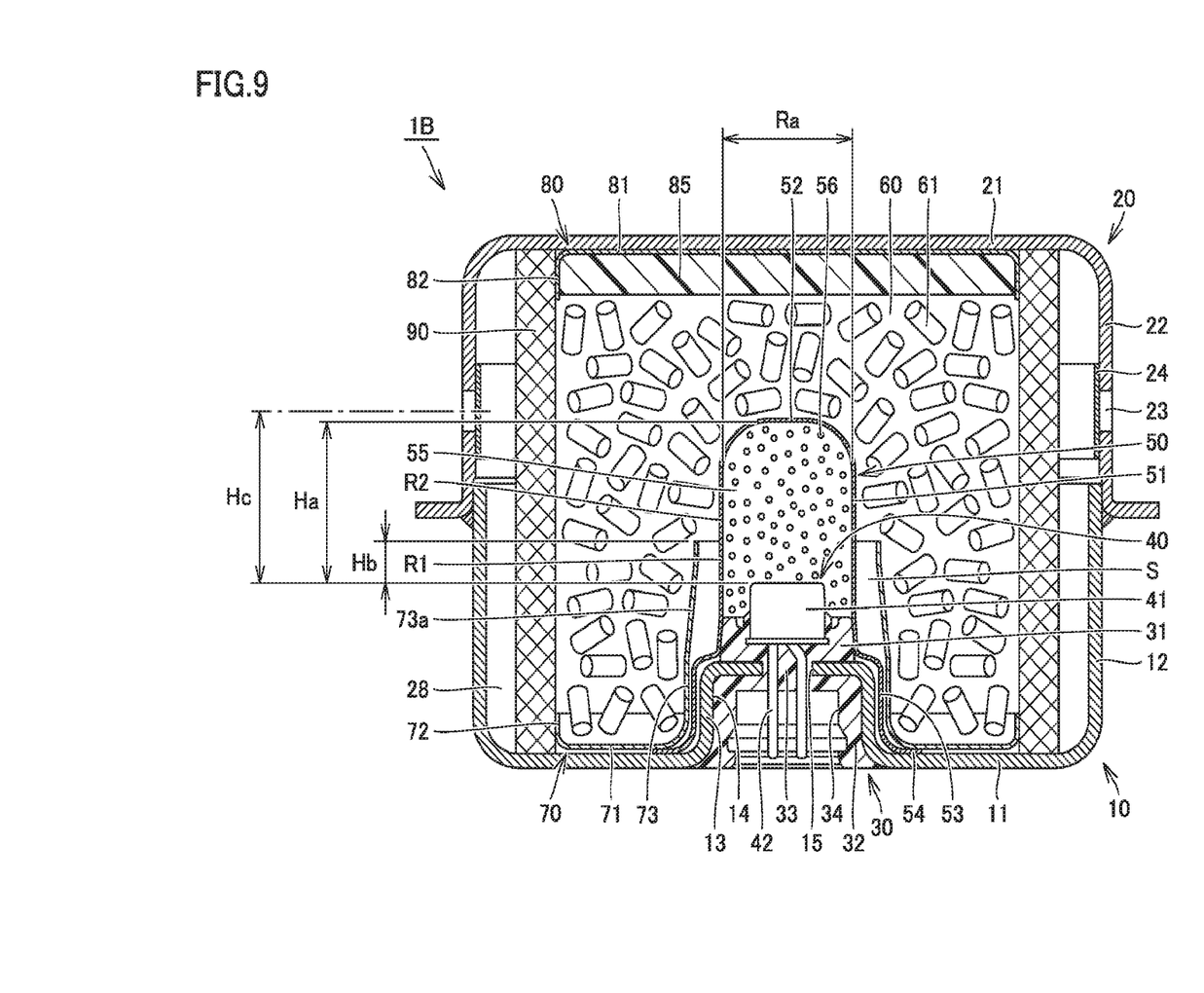
FIG. 9 is a schematic diagram of a disc-type gas generator in a second embodiment of the present invention.

FIG. 9 is a schematic diagram of a disc-type gas generator in a second embodiment of the present invention. A disc-type gas generator 1B in the present embodiment will be described below with reference to FIG. 9. Though disc-type gas generator 1B in the present embodiment is set to relatively be large in amount of generation of gas at the time of activation similarly to disc-type gas generator 1A in the first embodiment described above, an amount of generation of gas thereof is set to approximately 2.0 [mol].

As shown in FIG. 9, disc-type gas generator 1B in the present embodiment is constructed to be smaller in amount of loaded gas generating agent 61 and also amount of loaded enhancer agent 56 than disc-type gas generator 1A in the first embodiment described above by an amount comparable to decrease in amount of generation of gas at the time of activation. Accordingly, a length of cup-shaped member 50 along the axial direction of the circumferential wall portion of the housing is also shorter. Ra is set to approximately 14.0 [mm] whereas Ha is set to approximately 14.2 [mm], and a value of Ra/Ha is approximately 0.99.

Therefore, disc-type gas generator 1B in the present embodiment also satisfies the condition of Ra/Ha$\leq$1.00 and may suffer from the problem of delay in start of discharge of gas to the outside through gas discharge opening 23 after the time point of activation of igniter 40. Therefore, disc-type gas generator 1B in the present embodiment solves the problem also by providing partition wall portion 73 to surround a part of sidewall portion 51 of cup-shaped member 50 similarly to disc-type gas generator 1A in the first embodiment described above.

Disc-type gas generator 1B in the present embodiment is also constructed to satisfy the condition of Hb≤13.5 [mm]. Specifically, Hb is set to approximately 4.0 [mm]. Therefore, a ratio of Hb to Ha described above is approximately 0.28.

Disc-type gas generator 1B in the present embodiment is constructed such that Hc is set to approximately 16.0 [mm]. Thus, a part on the side of bottom plate portion 11 of each of the plurality of gas discharge openings 23 is provided to be opposed to second region R2 of sidewall portion 51 of cup-shaped member 50 in the radial direction of the circumferential wall portion of the housing.

Disc-type gas generator 1B thus constructed also obtains an effect the same as the effect described in the first embodiment above. Delay in start of discharge of gas to the outside through gas discharge opening 23 after the time point of activation of igniter 40 can effectively be prevented, and consequently a disc-type gas generator high in such performance as being free from delay in development of an air bag can be obtained.

Though an example in which the upper shell and the lower shell are made of press-formed products formed by press-working of a member made of a metal is shown by way of example in the first and second embodiments of the present invention described above, limitation thereto is not necessarily intended. An upper shell and a lower shell formed by combination of press-working and another type of working (forging, drawing, or cutting) may be employed, or an upper shell and a lower shell formed only by another type of working may be employed.

Though an example in which a protruding cylindrical portion is provided in the lower shell is shown by way of example in the first and second embodiments of the present invention described above, the present invention is also naturally applicable to a gas generator without a protruding cylindrical portion.

The embodiments disclosed herein are thus illustrative and non-restrictive in every respect. The technical scope of the present invention is delimited by the terms of the claims and includes any modifications within the scope and meaning equivalent to the description in the terms of the claims.

REFERENCE SIGNS LIST 1A, 1B disc-type gas generator; 10 lower shell; 11 bottom plate portion; 12 cylindrical portion; 13 protruding cylindrical portion; 14 depression portion; 15 opening; 20 upper shell; 21 top plate portion; 22 cylindrical portion; 23 gas discharge opening; 24 sealing tape; 28 gap; 30 holding portion; 31 inner cover portion; 32 outer cover portion; 33 coupling portion; 34 female connector portion; 40 igniter; 41 ignition portion; 42 terminal pin; 50 cup-shaped member; 51 sidewall portion; 52 top wall portion; 53 extension portion; 54 tip end portion; 55 enhancer chamber; 56 enhancer agent; 60 combustion chamber; 61 gas generating agent; 70 lower supporting member; 71 base portion; 72 abutment portion; 73 partition wall portion; 73a tapered portion; 80 upper supporting member; 81 base portion; 82 abutment portion; 85 cushion material; 90 filter; 100 lower mold; 200 upper mold; C cavity; R1 first region; R2 second region; S space

The invention claimed is:

1. A gas generator comprising:
a housing including a cylindrical circumferential wall portion provided with a gas discharge opening and a top plate portion and a bottom plate portion which close one and the other axial ends of the circumferential wall portion, the housing containing a combustion chamber which accommodates a gas generating agent;
an igniter assembled to the bottom plate portion, the igniter including an ignition portion which accommodates an ignition agent ignited at time of activation;
a cup-shaped member containing an enhancer chamber which accommodates an enhancer agent, the cup-shaped member being arranged to protrude toward the combustion chamber such that the enhancer chamber faces the ignition portion, a whole portion of the cup-shaped member which defines the enhancer chamber bursting or melting by combustion of the enhancer agent with activation of the igniter;
a cylindrical filter located in the housing and arranged along an inner circumferential surface of the circumferential wall portion to surround the combustion chamber; and
a fixing member which fixes the filter to the housing, the fixing member not bursting or melting even by combustion of the enhancer agent with activation of the igniter,
the cup-shaped member including a cylindrical sidewall portion which defines the enhancer chamber and a top wall portion which defines the enhancer chamber and closes an axial end portion of the sidewall portion located on a side of the top plate portion,
the fixing member including a base portion applied to the bottom plate portion along an inner bottom surface of the bottom plate portion, an abutment portion which abuts on an inner circumferential surface of the filter close to the bottom plate portion, and a cylindrical partition wall portion erected from the base portion toward the top plate portion,
Ra and Ha satisfying a condition of Ra/Ha≤1.00 where Ra represents an inner diameter of the sidewall portion and Ha represents a distance between the top wall portion and the ignition portion along an axial direction of the circumferential wall portion,
the sidewall portion including a first region located on a side of the bottom plate portion and surrounded by the partition wall portion and a second region located on a side of the top plate portion and not surrounded by the partition wall portion, by arranging the partition wall portion to reach a position in the combustion chamber intermediate along the axial direction of the circumferential wall portion,
an end portion of the partition wall portion on the side of the top plate portion being arranged closer to the top plate portion than the ignition portion in the axial direction of the circumferential wall portion,
the gas generating agent being arranged to face at least the top wall portion, the second region of the sidewall portion, and an outer circumferential surface of the partition wall portion, and wherein
the partition wall portion includes a tapered portion tapered toward the top plate portion.

2. The gas generator according to claim 1, wherein the Ra and the Ha further satisfy a condition of Ra/Ha≤0.80.

3. The gas generator according to claim 1, wherein Hb satisfies a condition of Hb≤13.5 [mm] where Hb represents a distance between the end portion of the partition wall portion on the side of the top plate portion and the ignition portion along the axial direction of the circumferential wall portion.

4. The gas generator according to claim 1, wherein the gas discharge opening is provided at a position closer to the top plate portion than the partition wall portion in the axial direction of the circumferential wall portion.

5. The gas generator according to claim 4, wherein
the gas discharge opening is provided at a position opposed to the second region of the sidewall portion in a radial direction of the circumferential wall portion.

6. The gas generator according to claim 1, wherein
the base portion is in a shape of an annular plate, and
the abutment portion is provided to extend from an outer edge of the base portion and the partition wall portion is provided to extend from an inner edge of the base portion.

7. The gas generator according to claim 1, wherein
the gas generating agent is not arranged in a space between the first region of the sidewall portion and the partition wall portion.

8. A The gas generator according to claim 1, further comprising:
a holding portion which is provided in the bottom plate portion and holds the igniter,
the bottom plate portion including a protruding cylindrical portion provided to protrude toward the top plate portion,
an opening in which the igniter is inserted and arranged being provided in an axial end portion of the protruding cylindrical portion located on a side of the top plate portion,
the holding portion being made of a resin molded portion at least partly secured to the bottom plate portion by being formed by attaching a fluid resin material to the bottom plate portion so as to reach a part of an outer surface of the bottom plate portion from a part of an inner surface of the bottom plate portion through the opening and solidifying the fluid resin material,
the bottom plate portion in a portion except for the protruding cylindrical portion being in such an inclined shape as being inclined toward the top plate portion, in a direction toward a radially outer side of the circumferential wall portion, and
an inclination angle $\theta 1$ of the bottom plate portion in the portion except for the protruding cylindrical portion satisfying a condition of $0[°]<\theta 1 \leq 2[°]$.

* * * * *